United States Patent
Cheng et al.

(10) Patent No.: US 10,581,665 B2
(45) Date of Patent: Mar. 3, 2020

(54) CONTENT-AWARE ANOMALY DETECTION AND DIAGNOSIS

(71) Applicant: NEC Laboratories America, Inc., Princeton, NJ (US)

(72) Inventors: Wei Cheng, Plainsboro, NJ (US); Haifeng Chen, West Windsor, NJ (US); Guofei Jiang, Princeton, NJ (US)

(73) Assignee: NEC Corporation (JP)

( * ) Notice: Subject to any disclaimer, the term of this patent is extended or adjusted under 35 U.S.C. 154(b) by 83 days.

(21) Appl. No.: 15/793,358

(22) Filed: Oct. 25, 2017

(65) Prior Publication Data

US 2018/0131560 A1    May 10, 2018

Related U.S. Application Data

(60) Provisional application No. 62/417,757, filed on Nov. 4, 2016.

(51) Int. Cl.
*G06F 15/173* (2006.01)
*H04L 12/24* (2006.01)
*H04L 12/26* (2006.01)

(52) U.S. Cl.
CPC ........ *H04L 41/0631* (2013.01); *H04L 41/064* (2013.01); *H04L 41/065* (2013.01); *H04L 41/0672* (2013.01); *H04L 41/16* (2013.01); *H04L 43/06* (2013.01); *H04L 43/0817* (2013.01); *H04L 43/0823* (2013.01); *H04L 43/106* (2013.01); *H04L 41/069* (2013.01); *H04L 43/16* (2013.01)

(58) Field of Classification Search
None
See application file for complete search history.

(56) References Cited

U.S. PATENT DOCUMENTS

| | | | |
|---|---|---|---|
| 8,185,781 B2 | 5/2012 | Chen et al. | |
| 2003/0018928 A1* | 1/2003 | James | G05B 17/02 714/25 |
| 2008/0027688 A1* | 1/2008 | Jiang | H04L 41/0681 703/2 |
| 2008/0228459 A1* | 9/2008 | Jiang | H04L 41/145 703/13 |
| 2010/0153316 A1* | 6/2010 | Duffield | G06F 21/552 706/12 |

(Continued)

OTHER PUBLICATIONS

Haifeng Chen et al., Exploiting Local and Global Invariants for the Management of Large Scale Information Systems, 2008 Eighth IEEE International Conference on Data Mining, Pisa, Dec. 2008, pp. 113-122.

(Continued)

*Primary Examiner* — Padma Mundur
(74) *Attorney, Agent, or Firm* — Joseph Kolodka

(57) ABSTRACT

Methods and systems for detecting a system fault include determining a network of broken correlations for a current timestamp, relative to a predicted set of correlations, based on a current set of sensor data. The network of broken correlations for the current timestamp is compared to networks of broken correlations for previous timestamps to determine a fault propagation pattern. It is determined whether a fault has occurred based on the fault propagation pattern. A system management action is performed if a fault has occurred.

6 Claims, 5 Drawing Sheets

(56) References Cited

U.S. PATENT DOCUMENTS

| | | | | |
|---|---|---|---|---|
| 2010/0262858 A1* | 10/2010 | Chen | ............... | G06F 11/0709 |
| | | | | 714/2 |
| 2011/0296244 A1* | 12/2011 | Fu | ............... | G06F 11/3608 |
| | | | | 714/37 |
| 2013/0219223 A1* | 8/2013 | Jiang | ............... | G06F 11/079 |
| | | | | 714/37 |
| 2014/0047279 A1* | 2/2014 | Sharma | ............... | G06F 11/079 |
| | | | | 714/39 |
| 2014/0053029 A1* | 2/2014 | Pistoia | ............... | G06F 11/0751 |
| | | | | 714/48 |

OTHER PUBLICATIONS

Wei Cheng et al., Ranking Causal Anomalies via Temporal and Dynamical Analysis on Vanishing Correlations, KDD Aug. 2016, San Francisco, California, USA.

Ira Cohen et al., Capturing, Indexing, Clustering, and Retrieving System History, SOSP'05, Oct. 2005, Brighton, United Kingdom.

Guofei Jiang et al., Discovering Likely Invariants of Distributed Transaction Systems for Autonomic System Management, 2006 IEEE International Conference on Autonomic Computing, Jun. 2006, pp. 199-208.

Gunjan Khanna et al., Automated Rule-Based Diagnosis Through a Distributed Monitor System, IEEE Transactions on Dependable and Secure Computing, Oct.-Dec. 2007, pp. 266-279.

Chao Liu et al., Failure Proximity: A Fault Localization-Based Approach, SIGSOFT'06/FSE-14, Nov. 5-11, 2006, Portland, Oregon, USA.

Shaula Alexander Yemini et al., High Speed and Robust Event Correlation, IEEE Communications Magazine, May 1996, pp. 82-90.

\* cited by examiner

CONTENT-AWARE ANOMALY DETECTION AND DIAGNOSIS

RELATED APPLICATION INFORMATION

This application claims priority to 62/417,757, filed on Nov. 4, 2016, incorporated herein by reference herein its entirety.

BACKGROUND

Technical Field

The present invention relates to anomaly detection and, more particularly, to detection of anomalous behavior in computerized systems using a progression of deviations from expected behavior.

Description of the Related Art

Fault diagnosis is the process of discovering information about system failures. Previous efforts to perform fault diagnosis have been based on the system invariant model, but have not been able to consider the content of vanishing correlations in a system and the temporal patterns thereof. System status is generally quite dynamic and time-evolving, resulting in false positives for conventional fault detection.

SUMMARY

A method for detecting a system fault includes determining a network of broken correlations for a current timestamp, relative to a predicted set of correlations, based on a current set of sensor data. The network of broken correlations for the current timestamp is compared to networks of broken correlations for previous timestamps to determine a fault propagation pattern. It is determined whether a fault has occurred based on the fault propagation pattern. A system management action is performed if a fault has occurred.

A system for detecting a fault includes an invariant graph module configured to determine a network of broken correlations for a current timestamp, relative to a predicted set of correlations, based on a current set of sensor data. An invariant comparison module includes a processor configured to compare the network of broken correlations for the current timestamp to networks of broken correlations for previous timestamps to determine a fault propagation pattern and to determine whether a fault has occurred based on the fault propagation pattern. A fault management module is configured to perform a management action if a fault has occurred.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention provide fault diagnosis by tracking the temporal evolution pattern of vanishing correlations in system monitoring data. Different evolving patterns of vanishing correlations from snapshots at multiple points in time provide the ability to track the early stages of a system failure and can be used to distinguish normal changes in a system's state and real system failures.

The present embodiments automatically diagnose system failures and determine whether the detected event is a true fault or not. Faults are traced back to collect evidence regarding the fault's origins. To accomplish this, the present embodiments jointly consider multiple snapshots of the system and detect when system invariants are violated. Patterns in such violations are detected and distinguished from random violations, which would be considered false positives that arise from normal system fluctuations.

Figure 1:
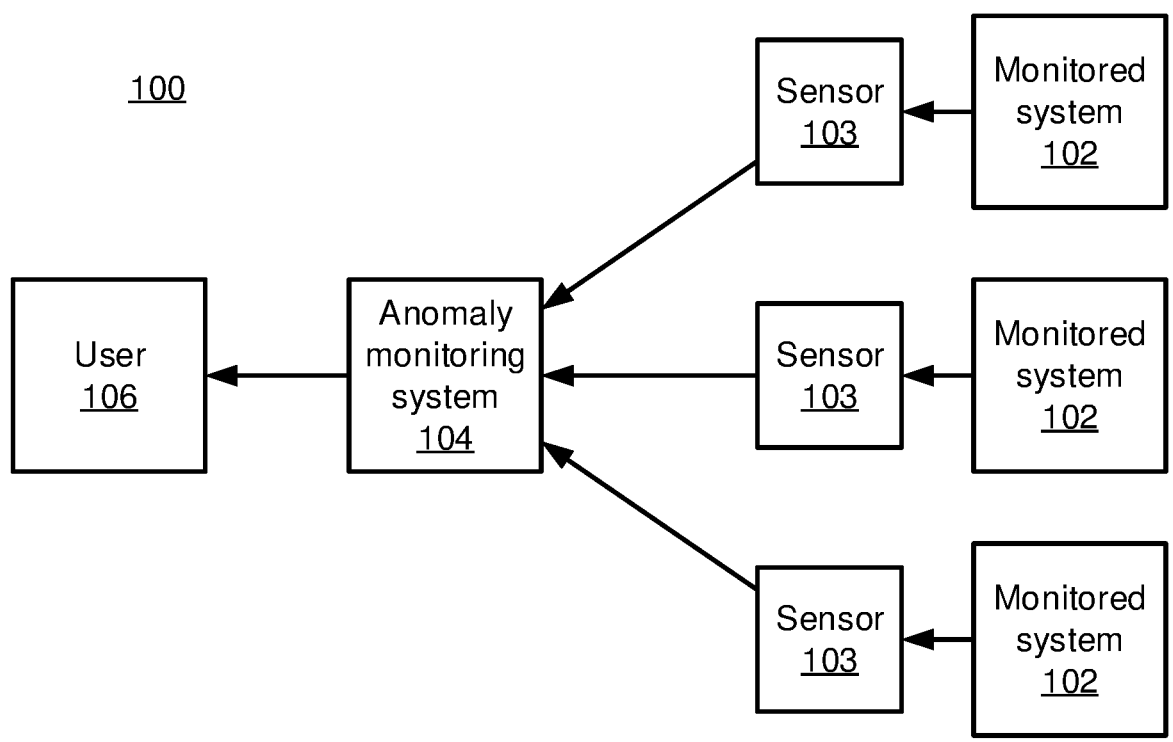
FIG. 1 is a block diagram of a system for monitoring anomalies across a set of monitored systems in accordance with an embodiment of the present invention.

Referring now in detail to the figures in which like numerals represent the same or similar elements and initially to FIG. 1, a security system 100 is shown. The security system 100 includes a number of monitored systems 102, each of which may represent, for example, a different computer, a different computer sub-system, a specific device, or a component of a device. For example, the monitored systems 102 may represent the components of a power generator, with each monitored system 102 representing the operation of that component. The operations of each monitored system 102 are monitored by a respective sensor 103, which collects data regarding the state of the monitored system, any events that occur within the monitored system, any log output from the monitored system, etc. In one example, a sensor 103 may measure physical states of a monitored system 102, such as temperature, vibration, etc.

Information from the sensors 103 is collected by an anomaly monitoring system 104. The anomaly monitoring system tracks correlations between the sensor outputs, noting in particular when invariants between such sensor outputs are broken. The anomaly monitoring system 104 finds patterns in the breaks in the invariants and uses the discovered patterns to distinguish between random fluctuations, changes in system state, and system failures. The anomaly monitoring system 104 then reports the discovered information to a user 106. In some embodiments, the anomaly monitoring system 104 provides control information to the monitored systems 102 to automatically address system failures.

Figure 2:
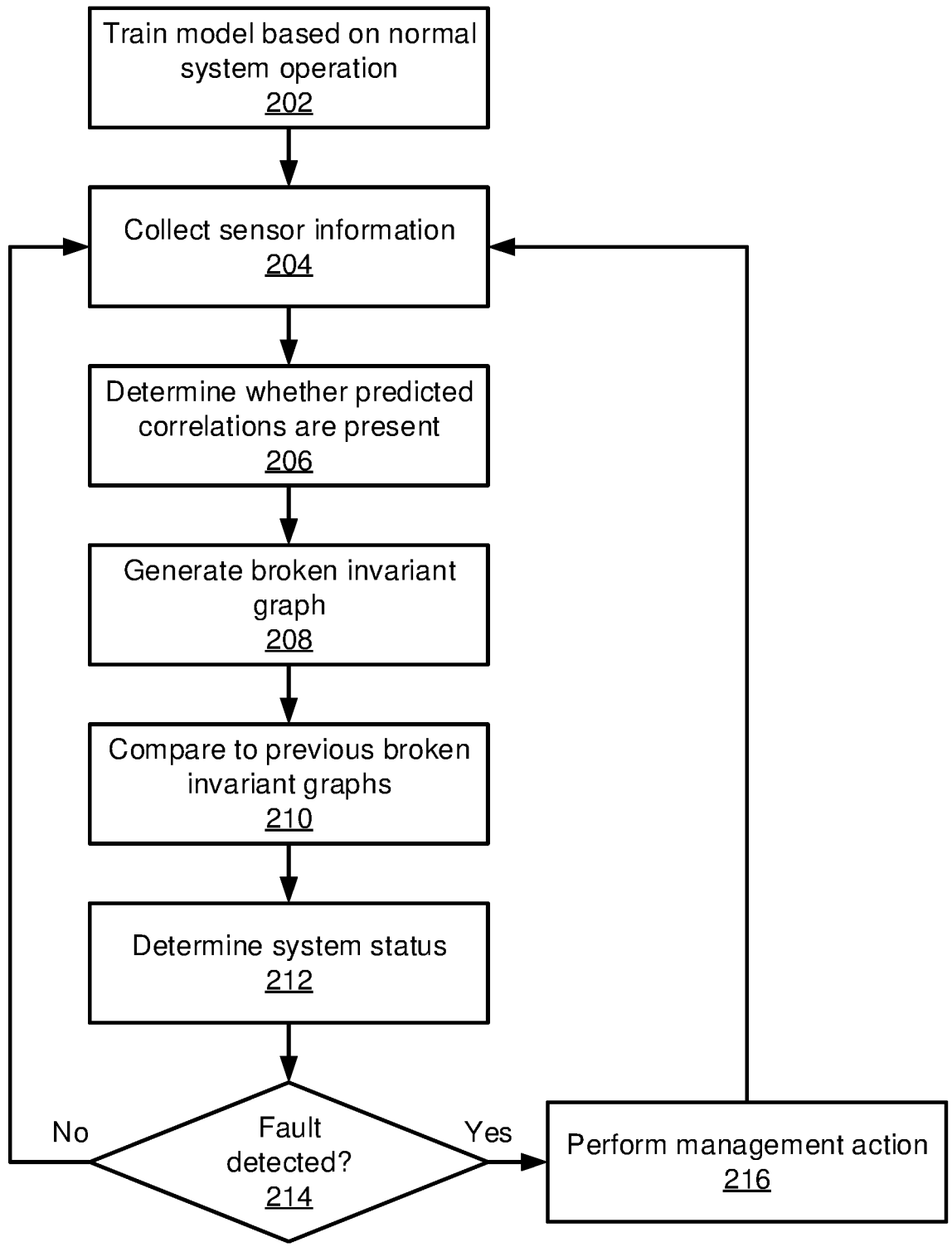
FIG. 2 is a block/flow diagram of a method for detecting faults across a set of monitored systems in accordance with an embodiment of the present invention.

Referring now to FIG. 2, a method for system failure analysis is shown. Block 202 trains a model (e.g., a system invariant analysis technology (SIAT) model) based on sensor readings from the monitored sensors 103 during normal system operation. In one example, the model is trained as a network of invariants that profile hidden, pair-wise correlations between different system components.

Links in an invariant network can be obtained to form an SIAT model. For a pair of time series from a system, x(t) and y(t), each time series being generated by respective system components, where t represents a time index, the relationship between the two time series can be described by a linear regression function:

$$y(t)+a_1y(t-1)+\ldots+a_ny(t-n)=b_0x(t)+\ldots+b_mx(t-m)$$

where [n, m] is referred to as the order of the model, which determines how many previous steps affect the current outputs x(t) and y(t). Parameters $a_i$ and $b_j$ indicate how strongly a previous step impacts the current output, which can be learned by the least-square fitting of the linear regression function to the training data.

Once the parameters are obtained, a fitness score can be used to evaluate how well the learned model fits the observed measurement data. A large fitness score indicates the relationship (x, y) holds well in normal system state. A pair of time series with a fitness score larger than a predefined threshold is referred to as an invariant of the system. The invariant network includes all invariants when the system is a normal state. During the system testing period, a broken invariant can be detected by checking if the time series generated by the two connected components still fit the learned model. If the error is large, the invariant (x, y) is declared to be broken. A broken network includes all broken invariants.

At each time snapshot during system runtime, block 204 collects a new set of sensor data. Block 206 then determines whether the correlations predicted by the model are present in the new sensor data and block 208 generates a broken invariant graph. If a correlation does not exist, this is represented by a broken link in the broken invariant graph, while confirmed predictions are represented by a whole link.

Block 210 compares the broken invariant graph of the current timestamp to those of previous timestamps to determine patterns in the evolution of the graphs. In particular, block 210 discriminates between broken invariants that appear to be the result of noise in the system (e.g., transient fluctuations that temporarily disrupt a predicted correlation) and patterns that propagate or that suddenly affect large numbers of correlations at once.

Block 212 thereby determines the status of the system 100. It is specifically understood that a lack of propagation of broken invariants across the invariant network represents a normal running scenario, where correlations are only temporarily disrupted and resume on their own. In contrast, for real system faults, the disruption of one monitored system 102 may lead to further disruptions in connected monitored systems 102, leading to a propagation of broken correlations as time goes on. Notably, this distinction is not based on the number of broken invariants in a given snapshot, but rather on how the pattern of broken invariants evolves over time.

Toward that end, blocks 210 and 212 begin at the time a broken invariant is detected and trace the contents of broken invariants backwards in time to locate early indications of a fault. Based on a precision and recall curve, block 210 determines if there exists a propagation pattern. This leads to three different cases. If broken invariants illustrate propagation behavior, block 212 determines that the anomaly represents a real fault in the system. If broken invariants appear randomly over a period of time, then block 212 determines that the anomaly represents a false positive. If a number of broken invariants show up instantly, with no evolving pattern, then block 212 determines that the system state has changed (e.g., turning off the system, starting a new workload, etc.), which may represent normal system behavior or may represent a catastrophic failure. The change of a system state reflects the fact that the system's running settings are changed globally and may refer to, e.g., upgrading system equipment or different running parameter settings, in which the system running statuses are considered to be normal, but which result in very different results from the time series monitoring.

If block 214 determines that a fault was detected, block 216 performs a system management action. In one embodiment, block 216 simply generates an alert to a human operator 106, including the anomalous timestamp and information regarding the relationships between sensors 103 that are characterized by the broken invariants, making it possible for the user 106 to investigate the fault. Thus, for example, if a pair of sensors 103 are expected to have a particular relationship (e.g., where a first sensor's value is a function of the second sensor's value) and the monitored systems 102 in question have deviated from the expected behavior, the report may indicate which monitored systems 102 are at issue, what the expected behavior was, and what the measured behavior is. The report may also indicate a measure of the magnitude of the anomaly (e.g., the number of broken invariants).

In another embodiment, block 216 take automatic actions to address the detected fault. Thus, for example, if the anomaly implicates monitored systems 102 that are particularly sensitive or dangerous, block 216 may automatically issue instructions to those monitored systems 102 to slow or stop their processes.

Because block 212 considers possible propagation of system faults, the present embodiments can also provide early warning when a number of broken invariants is still not high, but shows a clear fault propagation pattern. In addition, the present embodiments can also discover the time when the fault initially occurs by tracking a propagation pattern back to its origin, making it easier to identify the root cause of the fault.

Figure 3:
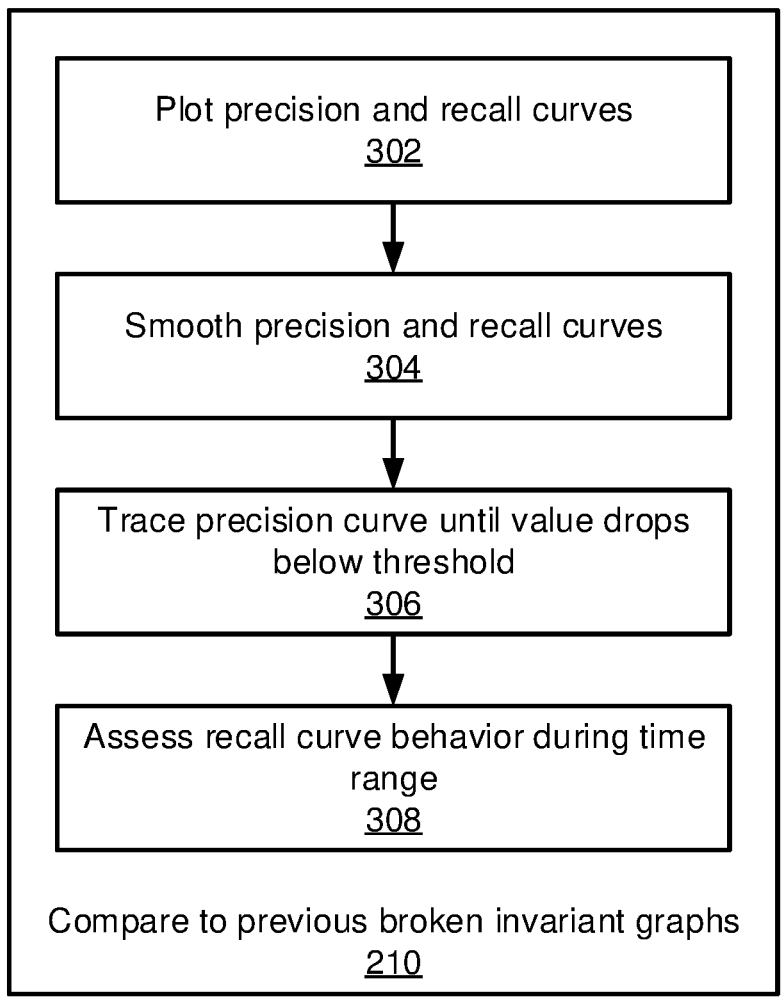
FIG. 3 is a block/flow diagram of a method for comparing broken invariant graphs over time to determine whether a fault has occurred in accordance with an embodiment of the present invention.

Referring now to FIG. 3, additional detail on the comparison of broken invariants at different times is shown. In some embodiments, precision and recall curves can be used in pattern recognition to represent the fraction of relevant instances among a set of retrieved instances and a fraction of relevant instances that have been retrieved over the total number of relevant instances, respectively. Thus, if the set of broken invariants at a present time (alternatively, the latest timestamp being considered) is denoted as $G_t$, and the set of broken invariants at an earlier time t is given as $G_t$, then the precision is given as $$\frac{|G_E \wedge G_t|}{|G_E|}$$

and the recall is given as $$\frac{|G_E \wedge G_t|}{|G_E|}.$$

These values are plotted for different values of t to form the precision and recall curves in block 302.

The precision and recall curves can be noisy, so smoothing may be applied to each curve by block 304. To accomplish this, block 304 uses a small window to slide over the precision and recall curves, with the values of each in the window being replaced by the value of the majority of values (in alternative embodiments, the average value) within the window.

Block 306 traces back the precision curve over time until the precision value is below a threshold (e.g., about 0.8). The detected region guarantees that the precision is at least above some threshold where the content in the snapshots are almost all shown in the reference snapshot, making them more likely to be root causes.

Within a time range that begins at the time at which the precision value drops below the threshold and ends at the final timestamp, block 308 checks whether the recall curve is increasing, where the increase may be, for example, strict monotonic or piecewise (where the mean of recall values in different time ranges are increasing). If so, block 308 determines a system fault. If no change is present, then block 308 determines a context switch. If the recall curve is shaking, then block 308 determines a false positive due to system noise. The beginning of the time range is tagged as the initial time of the event.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 4:
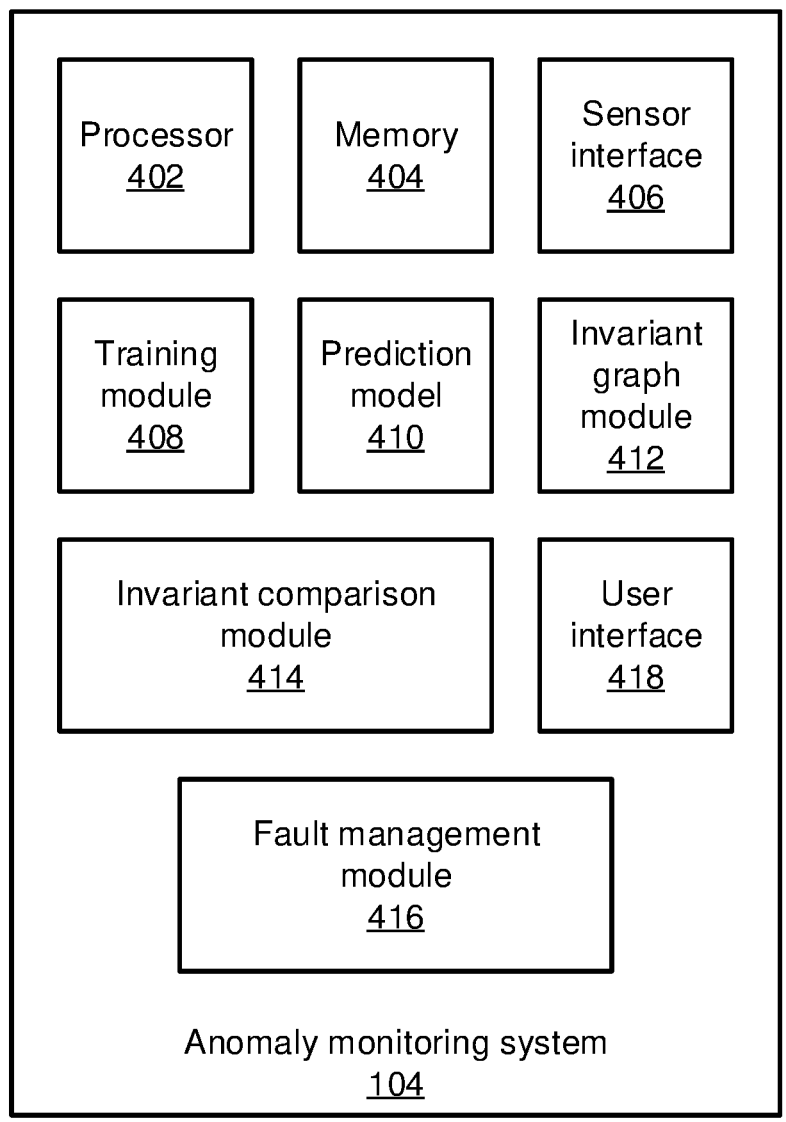
FIG. 4 is a block diagram of an anomaly monitoring system in accordance with an embodiment of the present invention.

Referring now to FIG. 4, additional detail on the anomaly monitoring system 104 is shown. The system 104 includes a hardware processor 402 and memory 404. A sensor interface 406 communicates with the sensors 103 and stores sensor information in the memory 404 in any appropriate format (e.g., in a time-indexed database). The sensor interface 406 may represent a network interface that communicates over an appropriate wired or wireless medium and may, additionally or alternatively, include dedicated interfaces configured to communicate with specific sensors 103. The system 104 also includes one or more functional modules that may, in some embodiments, be implemented as software that is stored in memory 404 and executed by the hardware processor 402. In other embodiments, the modules may be implemented as one or more application-specific integrated chips or field programmable gate arrays.

A training module 408 trains a prediction model 410 based on sensor information collected during a period of normal operation. The prediction model 410 is stored in memory 404 and establishes expected correlations between different sensor outputs and system states.

Invariant graph module 412 then collects sensor information for a current timestamp and determines which invariants predicted by the predicted model 410 have been broken. These broken invariant graphs are stored in the memory 404. Invariant comparison module 414 compares the broken invariant graphs over a time range to determine patterns in fault propagation, in particular discriminating between true faults and false positives.

Fault management module 416 takes an appropriate automatic management action in response to a fault being detected. In some embodiments, the fault management module 416 generates an alert for a user 106 using a user interface 418. In other embodiments, the fault management module 416 automatically takes action with respect to the fault, for example adjusting operational parameters or shutting down systems to prevent a fault from propagating or to prevent damage to the monitored systems 102.

Figure 5:
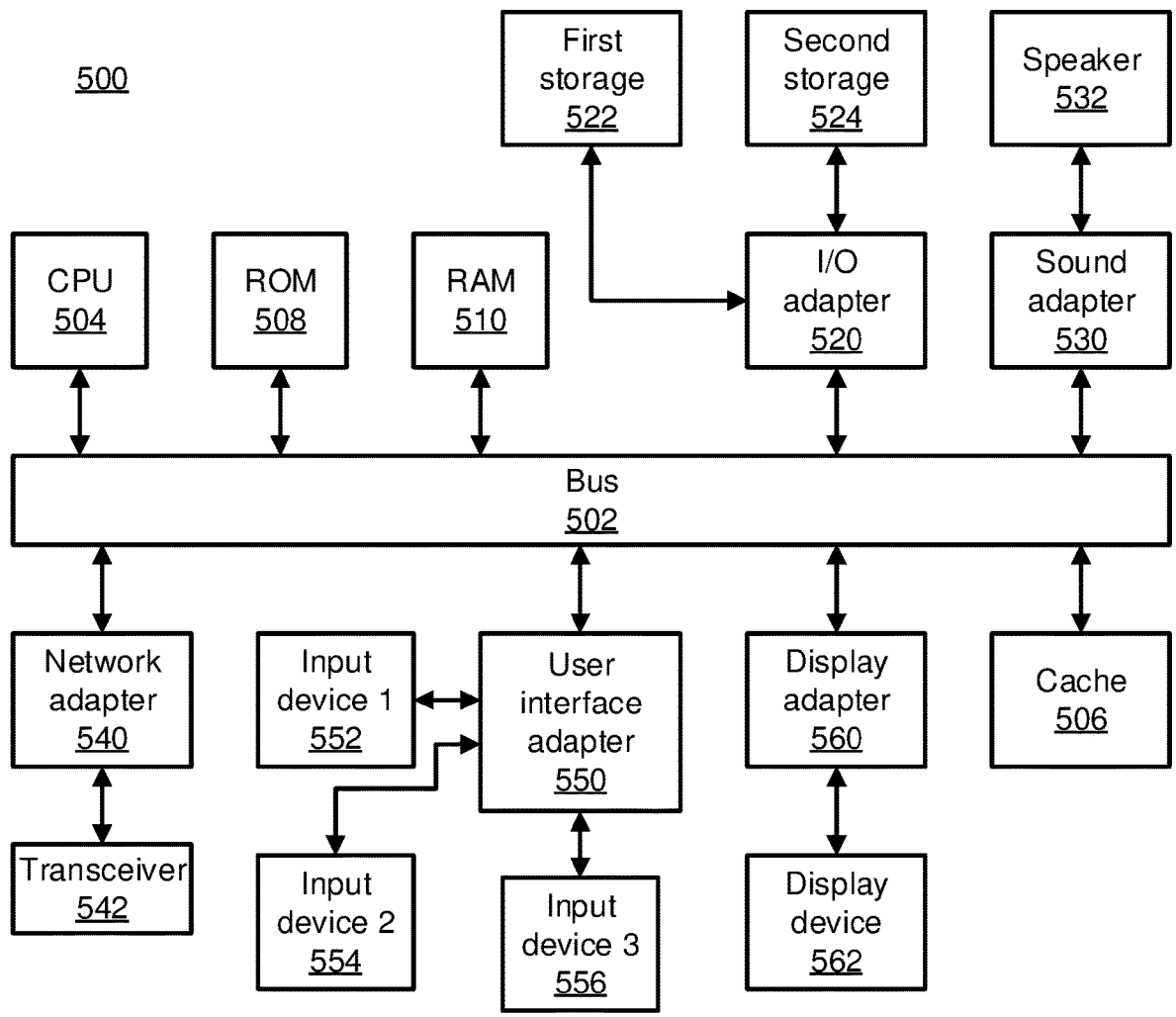
FIG. 5 is a block diagram of a processing system in accordance with an embodiment of the present invention.

Referring now to FIG. 5, an exemplary processing system 500 is shown which may represent the anomaly monitoring system 104. The processing system 500 includes at least one processor (CPU) 504 operatively coupled to other components via a system bus 502. A cache 506, a Read Only Memory (ROM) 508, a Random Access Memory (RAM) 510, an input/output (I/O) adapter 520, a sound adapter 530, a network adapter 540, a user interface adapter 550, and a display adapter 560, are operatively coupled to the system bus 502.

A first storage device 522 and a second storage device 524 are operatively coupled to system bus 502 by the I/O adapter 520. The storage devices 522 and 524 can be any of a disk storage device (e.g., a magnetic or optical disk storage device), a solid state magnetic device, and so forth. The storage devices 522 and 524 can be the same type of storage device or different types of storage devices.

A speaker 532 is operatively coupled to system bus 502 by the sound adapter 530. A transceiver 542 is operatively coupled to system bus 502 by network adapter 540. A display device 562 is operatively coupled to system bus 502 by display adapter 560.

A first user input device 552, a second user input device 554, and a third user input device 556 are operatively coupled to system bus 502 by user interface adapter 550. The user input devices 552, 554, and 556 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 552, 554, and 556 can be the same type of user input device or different types of user input devices. The user input devices 552, 554, and 556 are used to input and output information to and from system 500.

Of course, the processing system 500 may also include other elements (not shown), as readily contemplated by one of skill in the art, as well as omit certain elements. For example, various other input devices and/or output devices can be included in processing system 500, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 500 are readily contemplated by one of ordinary skill in the art given the teachings of the present principles provided herein.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for detecting a system fault, comprising:
   determining a network of broken correlations for a current timestamp, relative to a predicted set of correlations, based on a current set of sensor data;
   comparing the network of broken correlations for the current timestamp to networks of broken correlations for previous timestamps by determining a precision curve and a recall curve to determine a fault propagation pattern;
   determining that a fault has occurred based on the fault propagation pattern using a processor; and
   automatically shutting down one or more systems, by the processor, responsive to the determination that a fault has occurred to prevent the fault from propagating;
   wherein comparing the network of broken correlations for the current timestamp to networks of broken correlations for previous timestamps further comprises determining a time range between the current timestamp and a first timestamp at which a value of the precision curve drops below a threshold.

2. The method of claim 1, wherein comparing the network of broken correlations for the current timestamp to networks of broken correlations for previous timestamps further comprises determining a behavior of the recall curve within the time range.

3. The method of claim 2, wherein determining whether a fault has occurred comprises determining that a fault has occurred if the recall curve increases monotonically in the time range.

4. A system for detecting a fault comprising:
   a computing device including a processor and a memory operatively coupled to the processor, said memory having stored thereon computer executable instructions that when executed by the processor cause the system to execute:
      an invariant graph module configured to determine a network of broken correlations for a current timestamp, relative to a predicted set of correlations, based on a current set of sensor data;
      an invariant comparison module configured to compare the network of broken correlations for the current timestamp to networks of broken correlations for previous timestamps by determining a precision curve and a recall curve to determine a fault propagation pattern and to further determine that a fault has occurred based on the fault propagation pattern; and
      a fault management module configured to automatically shut down one or more systems, responsive to the determination that a fault has occurred to prevent the fault from propagating;
   wherein the invariant comparison module is further configured to determine a time range between the current timestamp and a first timestamp at which a value of the precision curve drops below a threshold.

5. The system of claim 4, wherein the invariant comparison module is further configured to determine a behavior of the recall curve within the time range.

6. The system of claim 5, wherein the invariant comparison module is further configured to determine that a fault has occurred if the recall curve increases monotonically in the time range.

* * * * *